July 2, 1929.  C. F. PETERSON  1,719,722
ELECTRIC HEATER
Filed March 2, 1928
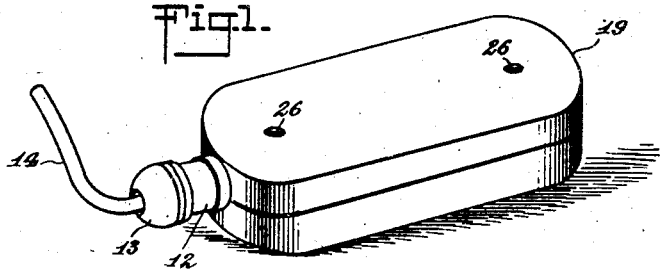
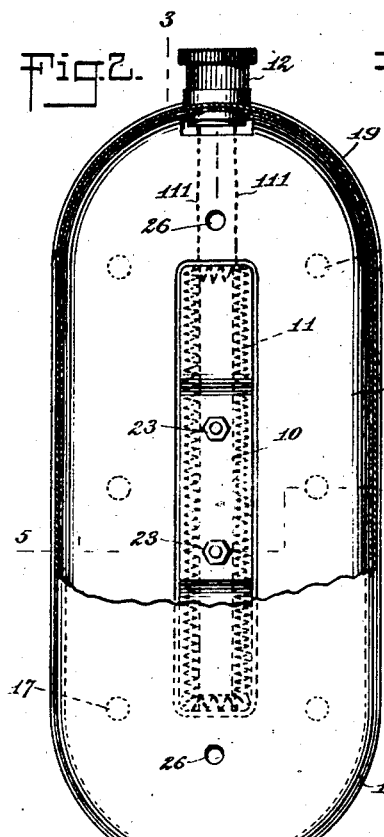
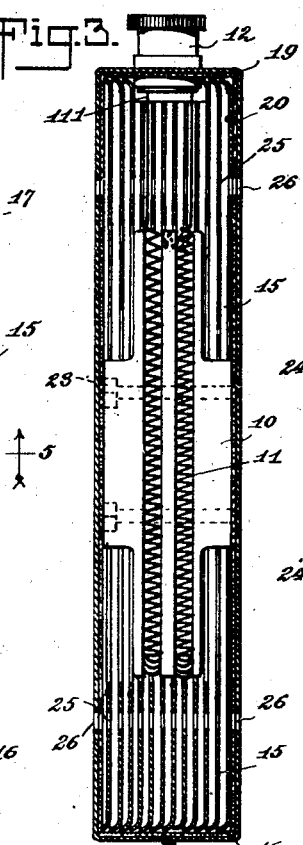
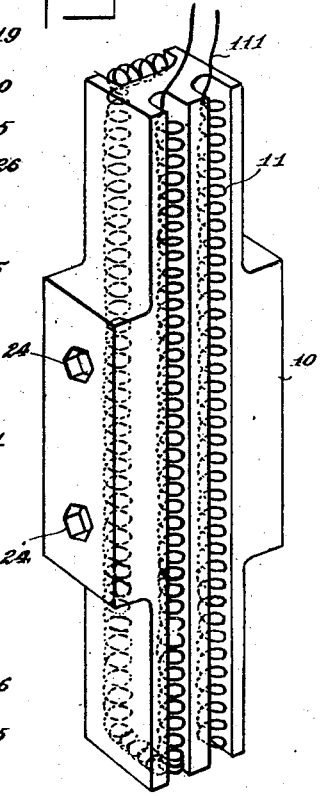
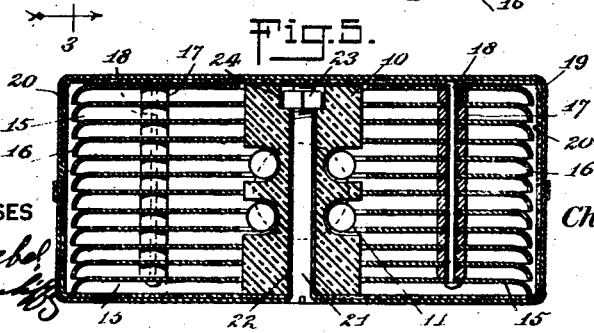
WITNESSES
INVENTOR
*Charles F. Peterson*
BY
ATTORNEY Patented July 2, 1929.

1,719,722

UNITED STATES PATENT OFFICE.

CHARLES F. PETERSON, OF NEW YORK, N. Y., ASSIGNOR OF ONE-HALF TO RUTH E. K. PETERSON, OF WASHINGTON, DISTRICT OF COLUMBIA.

ELECTRIC HEATER.

Application filed March 2, 1928. Serial No. 258,632.

My invention relates to an electric heater, and more particularly to an electric heater having dimensions and a form adapting it to function after the manner of a hot water bottle or bag.

The general object of my invention is to provide an electric heater of the indicated character, of simple and compact construction and adapted to be embodied in a form approaching that of a hot water bag, and having an electric heating element associated with heat absorbing and radiating elements so formed and arranged that the assemblage will function in a manner resulting in a quick heating of the heater and a comparatively slow radiation of the heat absorbed by the heat absorbing elements.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a perspective view of an electric heater embodying my invention;

Figure 2 is a central longitudinal sectional view of my improved heater, a portion of the outer casing being broken away.

Figure 3 is a longitudinal section as indicated by the line 3—3 of Figure 2;

Figure 4 is a perspective view of the heating unit;

Figure 5 is a transverse vertical section as indicated on the line 5—5 of Figure 2.

In carrying out my invention in accordance with the illustrated example, a heating unit designated generally by the numeral 10 is provided embodying an electric heating element 11, here conventionally shown. The terminals 111 terminate in a socket 12 of any approved form adapted to receive a plug 13 to establish electrical connection between line wire conductors 14 and the terminals 111 of the heating element 11. In practice, the insulating portion of the heating unit 10 is enlarged at the central portion, the ends being of reduced thickness.

Around the heating unit 10 are sheet metal or equivalent elements 15. There is a multiplicity of the elements 15 formed of stamped or sheet metal and extending at all sides of the heating unit 10. At the inner edges of the elements 15 each element extends in a single plane so that adjacent elements at the inner edges are parallel and afford an air space between the adjacent elements so that air and the heat from the unit 10 may readily reach the surfaces of the sheet metal elements 15. The purpose of the desired arrangement of the elements 15 in their construction and in their relation to the heating unit 10 is that the heat generated by the heating unit 10 may readily find access to the spaces between adjacent elements 15 for effectively and quickly heating the said elements 15.

The outer edges 16 of the elements 15 are curved or deflected away from the general plane of the elements 15, the purpose being to provide strength in the elements and a maximum mass of the heat absorbing and heat radiating material.

The heater includes a housing or container shell 19 which in practice is lined with a layer of asbestos 20 or equivalent material. The heater unit 10 is desirably in practice held to the shell or casing 19 and centered therein, for which purpose I provide a screw bolt 21. The screw bolt 21 passes transversely through bore 22 in the heater unit 10 and receives at the threaded end thereof a nut 23 which is accommodated in a depression 24 in the insulating material forming the body of the heater unit 10, as clearly shown in Figures 4 and 5.

The numeral 20 indicates a lining of asbestos or other heat insulating material at the interior of the shell 19. Attention is also called to the fact that in practice the various heat absorbing and heat radiating elements 15 are spaced apart by spacer collars 17 and pins 18 extending through the several elements 15.

In practice and advantageously I employ means to provide an air vent to the interior of the heater, for which purpose I form an opening 25 in the elements 15 and also form ventilating openings 26 extending through the shell or casing 19 and its lining 20.

The shell or casing 19 is usually formed in two halves in practice, the halves being united by soldering or other means permitting of ready separation when desired to afford access to the interior of the heater.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. An electric heater of the class described, including a casing, a heater unit enlarged at the center and of reduced thickness outwardly of said thickened central portion; together with sheet metal elements disposed about said heater unit and spaced apart, the inner edges of said elements affording free access to air to absorb the heat generated by the heater unit, the outer portions being flanged the one toward the adjacent one, said heater element adapted to radiate the heat absorbed from the heater unit.

2. An electric heater of the class described, including a casing, a heater unit enlarged at the center and of reduced thickness outwardly of said thickened central portion; together with sheet metal elements disposed about said heater unit and spaced apart, the inner edges of said elements affording free access to air to absorb the heat generated by the heater unit, the outer portion being flanged the one toward the adjacent one, said heater element adapted to radiate the heat absorbed from the heater unit, and a socket adapted to receive an electric plug, said socket having means connected with the terminals of the heater unit.

3. An electric heater of the class described, including a casing, a heater unit within said casing, together with sheet metal elements disposed about said heater unit and spaced apart, the inner edges of said elements affording free access to air to absorb the heat generated by the heater unit, the outer portions being flanged, said heater element adapted to radiate the heat absorbed from the heater unit.

Signed at New York in the county of New York and State of New York this 1st day of March A. D. 1928.

CHARLES F. PETERSON.